April 14, 1959 W. A. TERNES 2,881,860
AIR CLEANER AND SILENCER
Filed April 11, 1955

INVENTOR.
William A. Ternes
BY
Harness, Dickey & Pierce
ATTORNEYS

United States Patent Office 2,881,860
Patented Apr. 14, 1959

2,881,860

AIR CLEANER AND SILENCER

William A. Ternes, Grosse Pointe, Mich.

Application April 11, 1955, Serial No. 500,435

5 Claims. (Cl. 183—62)

My invention relates to silencing and cleaning devices for the intake air of internal combustion engines, one particular application of the invention being to the engines of passenger automobiles.

It is common knowledge that the air cleaner and silencer for the carburetor of modern passenger automobiles has assumed proportions that are startling. It is now so large that it adds an extra three inches or so to the height of the hood of the car. In compromising with the required size of this device, the inlet openings have been reduced or at least held down so that it presents a limiting factor on the volume of intake air to the engine. The present devices are also very expensive to make and their cost is far out of line with other parts of the passenger automobile.

It is the object of my invention to provide a new approach to the cleaning and silencing of intake air which will eliminate the above-mentioned deficiencies of the present methods. According to my invention the silencer is attached to the bottom of the hood of the automobile and has an outlet which is positioned so that it will fit snugly with the intake of the carburetor when the hood is lowered and locked in position. Instead of being cylindrical as in the present cleaner and intake silencer, the invention contemplates a device which is more in the nature of a large, shallow pan, the top of which is closed by the bottom of the hood. The invention also takes advantage of the usual Fiberglas pad that is affixed by the automobile manufacturer to the bottom of the hood and contemplates its use as a sound absorbing medium for the intake gases.

As will be readily seen, the silencer of this invention will very substantially reduce the cost of the device for silencing and cleaning intake air. Because of its flat nature it will take several inches off the height of the hood. It provides large openings for intake air so that it will not be a limiting factor on the volume of air supplied to the engine. In addition, by virtue of its attachment to the hood, it will be swung up out of the way when the hood is opened for inspecting or working on the engine.

These and other advantages and features of the invention will become apparent upon consideration of the accompanying drawings in which an illustrated embodiment is shown and wherein.

Figure 1:
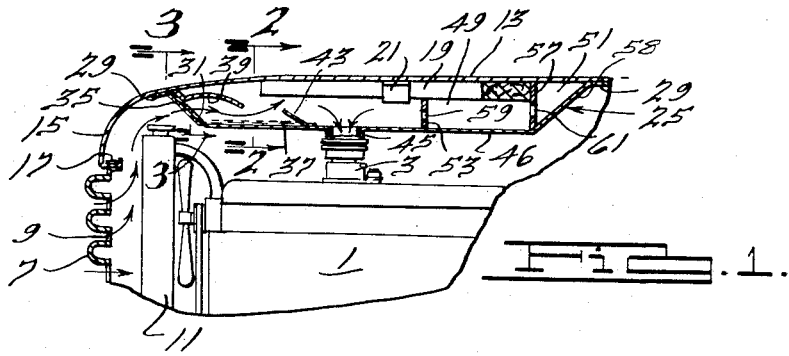
Figure 1 is a partial vertical section through a hood and engine of an automobile embodying the invention.
Figure 2:
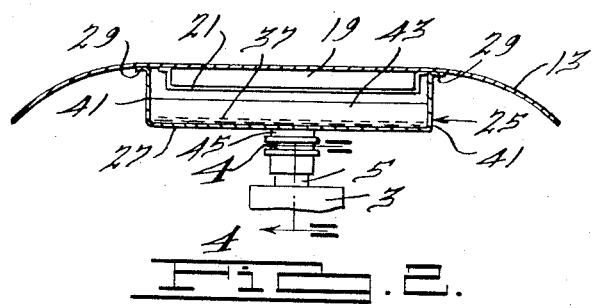
Fig. 2 is a section along the line 2—2 of Fig. 1.
Figure 3:
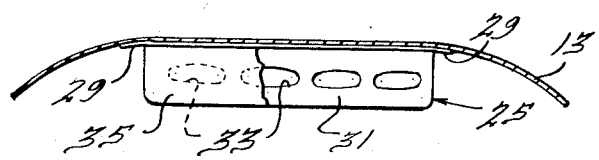
Fig. 3 is a section along the line 3—3 of Fig. 1, the filter pad for cleaning the air being removed.
Figure 4:
Fig. 4 is an enlarged view partly in section showing the silencer outlet connected to the air inlet of the carburetor.
Figure 4:
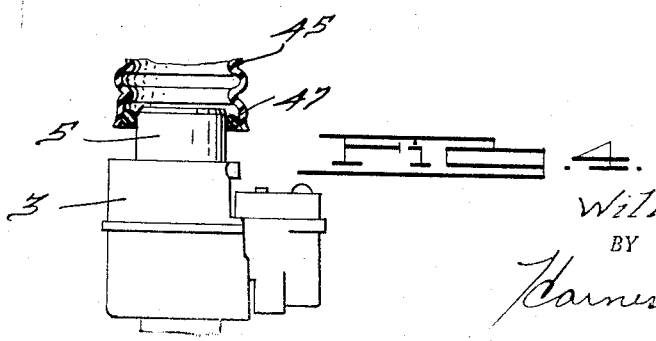

In the drawings the automobile engine 1 has a carburetor 3 with an air inlet 5. In accordance with convention, the engine 1 is mounted within a well of the automobile body which at its front end is enclosed by a grill 7 having the air inlet openings 9 which feed air to the radiator 11 and to the carburetor intake 5. Covering the engine 1 is a hood 13 which is pivoted on a horizontal axis (not shown) at its rear end as is conventional on present day automobiles. The front end 15 of the hood 13 is latched in the usual way to the top of the grill 7, as by a latching device 17. Affixed to the bottom of the hood 13 is a flat pad 19 of Fiberglas or other insulating and sound absorbing material and this may be held in place by a strap 21, all of this being conventional equipment and construction.

In accordance with my invention, I provide a relatively thin intake silencer and cleaner 25 which I prefer to affix to the bottom of the hood 13. The silencer 25 has a casing 27 which is in the form of a pan having flanges 29 whereby it is secured to the underside of the hood 13, gasket means being used to get the desired degree of air tightness in the joint, so that the hood and pan 27 together define the silencer housing. The front end 31 of the pan has a series of inlet openings 33 of suitable shape formed therein, the total area of which can be large enough so that they do not restrict the volume of air furnished to the engine 1. Preferably located in front of the openings 33 is a flat filter pad 35, similar to a furnace type filter, which will be composed of suitable material so as to effectively clean the air without imposing substantial resistance to its flow through the filter. The pad 35 can be held in place on the front end 31 of the pan 27 by suitable tabs, fasteners, or other means (not shown).

Adjacent the inlet openings 33 is provided an oil bath 37 to lubricate the incoming air which is deflected into the bath by the baffle 39. The oil is confined in place by the front wall 31 and the side walls 41 of the pan and a partition 43 extending across the width of the pan. It will be understood, of course, that the arrangement to house the oil bath can be made in various ways so long as it is confined against spillage when the hood is elevated or during motion of the car.

The muffler 25 is provided with an outlet 45 that may be conveniently formed in the bottom 46 of the pan 27. If desired, a short collar (not shown) can be provided in the casing around outlet 45 to prevent any particles separated by baffle action from air and settling on the bottom of pan 27 from going down into the intake 5. The outlet 45 is preferably formed as a flexible conduit of rubber or metal so that it can easily fit over the intake 5 for the carburetor 3 and accommodate itself to dimensional variations. Various forms of outlet 45 can be used, of course, the particular type illustrated fitting over the outside of the intake 5 and carrying with it a sponge rubber seal 47 that will readily conform to the intake 5 and seal the outlet 45 against noise producing leakage. The seal 47 can either be a part of the intake or a part of the outlet 45, it being preferably on the outlet. Obviously, outlet 45 could be arranged to fit inside intake 5.

Within the pan 27 are suitable silencing means and constructions to remove the noise of the intake air. One of these will be the conventional absorbent pad 19 referred to above which, as presently used in automotive vehicles, is of a sound absorbent material. It is preferable that this pad be located in alignment with the outlet 45. Also within the pan 27 will be partitions or baffles or other sound attenuating devices such as the resonator chambers 49 and 51 defined by the transverse partitions 53 and 57 (and back 58 of pan 27) having openings therein as indicated at 59 and 61. As shown in the drawings, air would enter the chamber 49 through opening 59 and the chamber 51 through opening 61. It would leave these chambers by the same openings so that it will be seen that the two chambers act as a compound resonator. It is, of course, within the purview of the invention to provide various other silencing arrangements in the silencer 25.

While the silencer 25, for reasons of economy, preferably uses the hood 13 as a part of the casing it will be understood that the pan 27 could be completely closed (except for inlet and outlet) and attached to the underside of the hood as an independent unit.

It will now be seen that the invention has provided an improved air intake cleaner and silencer and it will be recognized that the construction shown is intended to illustrate the principles of the invention and that variations in structure can be made within the spirit and scope of the appended claims.

I claim:

1. An intake silencer for attachment to the bottom of a movable horizontal vehicle hood comprising a substantially flat housing, means for securing said housing to the underside of said hood, said housing having an outlet automatically connecting with the air intake of a carburetor when said hood is in lowered position and automatically disconnecting from said intake when the hood is raised, said housing having an inlet for air, and silencing structure comprising partition means forming at least one dead end chamber within said housing.

2. An air intake cleaner and silence for a vehicle with an internal combustion engine and a hood over the engine comprising a housing having cleaning means and separate silencing means therein, said silencer means comprising sound absorbent material and sound absorbing dead end chambers, said housing having an outlet automatically connecting with the air intake of said engine when said hood is in lowered position and automatically disconnecting from said intake when the hood is raised, and means for supporting said housing on the hood with said outlet in connected position with the air intake.

3. An intake silencer for attachment to the bottom of a movable horizontal automobile hood comprising a substantially flat housing, means for securing said housing to the underside of said hood, said housing having an outlet automatically connecting with the air intake of a carburetor when said hood is in lowered position and automatically disconnecting from said intake when the hood is raised, said housing having inlet openings for air, and silencing structure comprising partitions forming dead end resonator chambers within said housing, said chambers being spaced laterally from the direct path of air through said housing.

4. An intake silencing device for internal combustion engines comprising a movable hood for the engine having a pad of sound absorbent material affixed to its underside, a sheet metal housing surrounding said pad and secured to the underside of the hood for movement with it, said housing having an inlet for air, said housing having an outlet for air adapted for connection to the intake of a carburetor, said housing providing a passage for air between the inlet and outlet communicating the air with said sound absorbent material, and partitions within the housing providing sound attenuating structure in communication with air flowing through the housing.

5. An intake air cleaner and silencer for attachment to the bottom of a movable horizontal vehicle hood comprising a substantially flat housing, means for securing said housing to the underside of said hood, said housing having an outlet automatically connecting with the air intake of a carburetor when said hood is in lowered position and automatically disconnecting from said intake when the hood is raised, said housing having an inlet for air, silencing structure comprising partition means forming at least one dead-end chamber within said housing, and a removable filter element supported by said housing adjacent said inlet, in the path of air flowing through said housing.

References Cited in the file of this patent

UNITED STATES PATENTS

| | | |
|---|---|---|
| 752,386 | Dunlop et al. | Feb. 16, 1904 |
| 1,855,038 | Walker | Apr. 19, 1932 |
| 1,859,644 | Altgelt | May 24, 1932 |
| 1,873,252 | Altgelt | Aug. 23, 1932 |
| 1,934,463 | Hartsoch | Nov. 7, 1933 |
| 1,953,785 | Sullivan | Apr. 3, 1934 |
| 2,037,884 | Day | Apr. 21, 1936 |
| 2,299,157 | Lowther | Oct. 20, 1942 |
| 2,564,814 | Perrin | Aug. 21, 1951 |
| 2,701,024 | Thomas | Feb. 1, 1955 |

FOREIGN PATENTS

| | | |
|---|---|---|
| 391,180 | Great Britain | Apr. 18, 1933 |